UNITED STATES PATENT OFFICE.

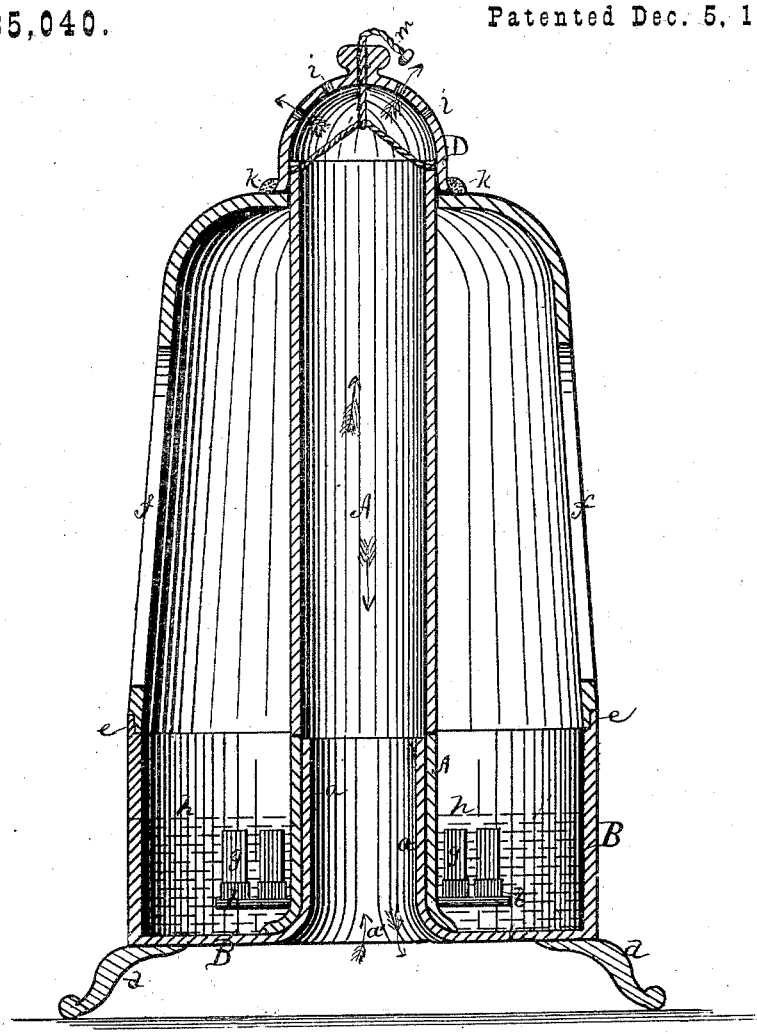
HANNAH MILSOM.
OZONE MACHINE.
No. 185,040. Patented Dec. 5, 1876.

HANNAH MILSOM, OF BUFFALO, NEW YORK.

IMPROVEMENT IN OZONE-MACHINES.

Specification forming part of Letters Patent No. 185,040, dated December 5, 1876; application filed September 9, 1876.

*To all whom it may concern:*

Be it known that I, HANNAH MILSOM, of Buffalo, in the county of Erie and State of New York, have made certain Improvements in Ozone-Machines, of which the following is a specification:

This invention is to provide a simple and cheap machine for the generation, purification, and emission of ozone; and the invention consists in its construction and arrangement, and the material employed in the several parts.

This invention also consists in purifying the ozone, without the use of chemicals or water, by its passage through the porous earthenware walls of the machine, all as hereinafter explained.

In the drawing, the figure represents a vertical sectional elevation of the entire machine.

A represents a central tube or open pipe, running the entire length of the machine. This is constructed of porous material, such as is known as earthenware, and such as flower-pots, tile-pipe, &c., are made of, and unglazed, except the lower part, which sets in water. This acts as an ozone, and air-flue, and purifier. It sets on the bottom of a dish or base, B, and over a projecting tube, $a\ a'$, formed in the center of the bottom of said dish, for the free admission of air into the central tube A. Around the lower end of the central tube A is formed a rim or dish, $b$, on which the phosphorus $g$ is set, or tubes or other receptacles may be cast, on and into which the phosphorus will be put. The base-dish B is made of any glazed or other ware, and has upright sides $c$, forming a sort of bowl, with feet $d\ d$ on the bottom to raise it from the floor or other place, so that an unimpeded draft may be had through the open bottom $a'$. The rim of the dish B is grooved or has a flange, $e$, so that a close-joint can be made with the walls of the ozone-generating chamber C, and which is constructed also of porous earthen or other ware, and has mica windows $f\ f$ in the sides, so that the interior of the machine may at all times be visible, and the combustion of the phosphorus noticed and controlled, as hereinafter more particularly stated.

This chamber, being porous, is also an additional advantage in purifying the ozone, which may pass through the walls and the central tube A. This ozone-purifying chamber is rounded over at the top, with an opening therein sufficient to inclose the top of the central tube A. Above this is set a removable dome or cap, D, made high enough to give an upright play to the tube A, which is raised or lowered by a cord, $m$, wire, or other suitable devices, to expose or diminish the height of the phosphorus $g$ in the water contained in the base B.

In the drawing, the phosphorus sticks are shown below the water-level $h$, which is done when the machine is not in use or operation, as the raising or lowering of the central tube, of course, raises or lowers the phosphorus with it, and by this means the height, and, consequently, the combustion, is controlled, so as not to burn too fast or too slow. The windows $f\ f$ are for the purpose of noting this from the outside, as before stated. The cover or dome D has several openings or perforations, $i\ i$, therein for the escape or outflow of the ozone.

The foregoing describes the general construction and arrangement of the machine and its parts; but particular stress will be laid on the material out of which it is made—viz., porous earthenware or its equivalent, as this permits an inward flow of air and outward flow of ozone through its pores, and which purifies itself as it thus passes through this earthenware, no trace of acid being found outside, and, by all well-known tests, pure ozone is produced, the acid dropping down inside into the water in the base-dish B, where it is drawn off, and fresh water supplied when necessary.

The operation is as follows: The central pipe A is raised sufficiently to expose the phosphorus above the water-level $h$ when the action commences, the fumes arising in a cloud-like vapor into the ozone-separating chamber C, where it mingles with the air constantly coming therein through the walls until the separation is completed, the acid and other deleterious substances dropping into the water below, and the ozone passing through the walls of the central tube A or outer walls C, and out at the bottom $a'$ or top of said tube, according to the draft. Air and ozone are, therefore, constantly passing through it when the machine is in operation.

I claim that these porous walls, made of this or similar ware, aid greatly in freeing the ozone from the acid, all tests showing this to be the case, and no other purifying medium is employed in this device, neither alkalies or chemicals of any sort, or cloths, &c.

A suitable packing, $k$, will be used around the junction of the cap D, tube A, and chamber C; also where the chamber C and base B join, if necessary.

By this machine the expense of an ozone-generator is greatly reduced, a safer, better, and simpler machine is supplied, and a better quality of ozone is produced.

I disclaim, as "porous," cloth, wood, wire-work, and such substances, and confine my meaning to earthenware or other unglazed ware or pottery.

The form of the machine is not important so long as the parts are represented.

By this construction, the ozone generated has several exits all around through the walls C, and through the tube A, at either top or bottom, according to the draft, as stated.

In a large machine several pipes A may be employed with corresponding openings in the bottom of the base B, and phosphorus-holders attached thereto. For ordinary machines, one central pipe will be sufficient, as shown.

For small machines for use in families, the base-bowl B and ozone-chamber walls C will be made of metal having a non-corrosive surface, like porcelain, &c. This is to make the machine less liable to damage or breakage by accident. They will have the same construction otherwise, and the central porous tube A will then do all the work of purifying which it is thought will be sufficient for a small machine.

The construction or parts, the material employed, and the fact of purifying ozone without the aid of chemicals of any sort, cloths, or water, (except that used in the base-dish,) are the important features of my invention.

I claim—

1. The ozone-machine, constructed with the base B, with the tube opening or openings $a$ $a'$ therein, the central tube or tubes A, with phosphorus-holder $b$ therein, the separating ozone-chamber C, and cap D, substantially as and for the purpose specified.

2. The process of making ozone, which consists in passing the ozonized fumes, evolved by submerging phosphorus in water, through the unglazed or porous earthenware walls of the inclosing-chamber, whereby the ready ingress of air by diffusion, and the separation of the acid fumes is effected, substantially as herein shown and described.

In witness whereof I have hereunto signed my name in the presence of two subscribing witnesses.

HANNAH MILSOM.

Witnesses:
J. R. DRAKE,
THOMAS H. PARSONS.